3,661,771
SEPARATION OF ORGANOSULFUR COMPOUNDS FROM HYDROCARBONS

Richard H. Havens, Kansas City, Mo., assignor to Gulf Research & Development Company, Pittsburgh, Pa.
No Drawing. Filed July 7, 1969, Ser. No. 839,709
Int. Cl. C10g 29/22; C07c 9/00
U.S. Cl. 208—240
8 Claims

ABSTRACT OF THE DISCLOSURE

Organosulfur compounds such as n-propylmercaptan, n-amylmercaptan, ethylsulfide, and methyl disulfide are removed from hydrocarbons, such as isooctane, by heating the hydrocarbon solution in contact with dimethylsulfate, cooling, and removing the dimethylsulfate.

BACKGROUND

This invention pertains to a method for the separation of mercaptans from hydrocarbons.

The importance of removing sulfur compounds from petroleum has long been recognized. For example, see the editorial in Oil and Gas Journal, vol. 67, p. 21 (1969). Reactions of the sulfide and disulfide with dimethylsulfate (DMS) to form sulfonium derivatives were expected. However, there was no a priori evidence to predict that the mercaptan would also react. There is no mention of such a reaction as the one indicated in this invention in Reid's text on mercaptans, Reid, Organic Chemistry of Bivalent Sulfur, vol. 1 (1958). A search of Chemical Abstracts uncovered only one paper concerned with a reaction of a mercaptan with DMS, and this was promoted by potassium hydroxide, M. Gianturco, Gazz Chim ital 82, 595 (1952).

SUMMARY

It has been found that mercaptans and sulfides can be virtually quantitatively removed from hydrocarbons, such as isooctane, by treatment with dimethylsulfate (DMS). The process is simple and could easily be made continuous. It has been applied to the removal of n-propylmercaptan, n-amylmercaptan, ethylsulfide, and methyl disulfide. The method consists of heating a hydrocarbon solution of the organosulfur compound with DMS. After cooling, the DMS layer can be separated, or the hydrocarbon can be distilled in the presence of DMS.

The method should prove valuable for removing two of the most common types of organosulfur compounds in petroleum. Some crude oils contain only sulfides and mercaptans as sulfur contaminants, C. J. Thompson et al., Anal. Chem. 27, 175 (1955). Under certain conditions, such as longer reaction time, it should be applicable to disulfides. DMS will not react with thiophene, but initial evidence indicates that it will extract it.

Manufactured from methanol and $H_2SO_4$, DMS is relatively inexpensive. The method itself should be inexpensive, since it requires only stoichiometric quantities. Depending on the reactions which occur, it is possible that the DMS (and the sulfur compounds) would be recoverable.

One problem associated with the process is that the high-boiling DMS forms an azeotrope to a small extent with isooctane. Several techniques for getting around this problem present themselves:

(1) Addition of a third component to solubilize the DMS in isooctane.
(2) Separation of DMS layer before distillation.
(3) Water extraction of distillate.
(4) Use of a petroleum ether-soluble sulfate, such as dipropylsulfate.

Use of a petroleum-soluble sulfate might also accelerate the salt-forming reaction to prove more efficient than DMS.

The temperature at which this method is carried out is not critical and can be any temperature at which the reaction to remove the organosulfur compounds takes place. For example, any temperature below the boiling point of the hydrocarbons containing the organosulfur compounds could be used. This generally would be between 25° to 200° C., but could be any temperature between the ambient temperature to the boiling point of the hydrocarbons. A preferable range would be 50 to 100° C., for example, about 95° C. The time for which the hydrocarbons are heated in this method is any time which is sufficient to remove the desired amount of organosulfur compounds, about $\frac{1}{10}$ to about 10 hours, or preferably 1 to 7 hours.

PREFERRED EMBODIMENTS

In the following experiments 100 ml. aliquots of 0.1% solution were heated with 10 ml. of DMS. The DMS layer was separated and the isooctane was distilled through a Vigreux column. Gas-liquid chromotographic analysis was performed on extracts (isooctane before distillation) and distillates. The results were as follows:

| Compound | Parts per million | | | Time, hr. |
| --- | --- | --- | --- | --- |
| | Before treatment | Extract | Distillate | |
| n-Propylmercaptan | 1,000 | <1 | <1 | 2 |
| Ethylsulfide | 1,000 | Nil | Nil | 2 |
| Methyl disulfide | 1,000 | 390 | 266 | 2 |
| Do | 1,000 | Nil | Nil | 7 |

All extracts and distillates were clear and colorless and the mercaptan and sulfide extracts and distillates were sheet, with no hint of organosulfur odor.

What is claimed is:

1. A method for the removal of organosulfur compounds selected from the group consisting of n-propylmercaptan, n-amylmercaptan, ethylsulfide, and methyl disulfide from isooctane containing less than 1% by weight of said organosulfur compounds in solution consisting of
    heating at a temperature of about 95° C. said isooctane in contact with dimethylsulfate, for 1 to 7 hours, then
    cooling said isooctane to ambient temperature, and thereafter
    separating said dimethylsulfate from said isooctane and dimethylsulfate mixture by distillation of said isooctane to thereby recover purified isooctane.

2. A method for the removal of organosulfur compounds from hydrocarbons comprising
    heating said hydrocarbons in contact with dimethylsulfate, then
    cooling said hydrocarbons to ambient temperature, and thereafter
    separating said dimethylsulfate from said isooctane and dimethylsulfate mixture by distillation of said isooctane to thereby recover purified isooctane.

3. The method of claim 2 wherein the hydrocarbons are petroleum hydrocarbons, said heating takes place below the boiling point of the hydrocarbons, for a time of about $\frac{1}{10}$ to about 10 hours.

4. The method of claim 3 wherein said hydrocarbon is isooctane.

5. The method of claim 3 wherein said hydrocarbons are heated at a temperature between about 25 to about 200° C. for about $\frac{1}{10}$ to about 10 hours.

6. The method of claim 5 wherein said hydrocarbons are heated at a temperature from about 50 to about 100° C. for about 1 to 7 hours.

7. The method of claim 2 wherein said organosulfur compounds are selected from the group consisting of n-amylmercaptan, n-propylmercaptan, ethylsulfide and methyl disulfide.

8. The method of claim 5 wherein said organosulfur compounds are selected from the group consisting of n-amylmercaptan, n-propylmercaptan, ethylsulfide and methyl disulfide.

References Cited

UNITED STATES PATENTS

| | | | |
|---|---|---|---|
| 2,908,731 | 11/1959 | Koble | 260—677 |
| 3,309,309 | 3/1967 | Hess | 208—240 |
| 3,184,405 | 5/1965 | Hoover | 208—227 |
| 2,365,898 | 12/1944 | Morris et al. | 208—240 |
| 2,367,348 | 1/1945 | Harrington | 208—237 |
| 2,066,925 | 9/1936 | Yabroff et al. | 196—32 |
| 2,041,754 | 5/1936 | Gary | 196—40 |
| 2,912,374 | 11/1959 | Maze | 208—189 |
| 2,248,496 | 7/1936 | Forney | 196—13 |
| 3,376,217 | 2/1965 | De Grange et al. | 208—224 |

OTHER REFERENCES

Chemical Refining of Petroleum, Kalichevsky, p. 249 (1942), Reinhold Pub., New York.

C. J. Thompson et al.: Anal. Chem., 27, 175 (1955).

DELBERT E. GANTZ, Primary Examiner

J. M. NELSON, Assistant Examiner

U.S. Cl. X.R.

208—293; 260—676